United States Patent
Abou-Nasr et al.

(10) Patent No.: US 9,663,112 B2
(45) Date of Patent: May 30, 2017

(54) ADAPTIVE DRIVER IDENTIFICATION FUSION

(71) Applicant: Ford Global Technologies, LLC, Dearborn, MI (US)

(72) Inventors: Mahmoud A. Abou-Nasr, Canton, MI (US); Johannes Geir Kristinsson, Ann Arbor, MI (US); Ryan Lee Baker, Dearborn Heights, MI (US); Timothy Mark Feldkamp, Ann Arbor, MI (US); Arun Dutta, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 80 days.

(21) Appl. No.: 14/665,302

(22) Filed: Mar. 23, 2015

(65) Prior Publication Data

US 2016/0101783 A1    Apr. 14, 2016

Related U.S. Application Data

(60) Provisional application No. 62/061,821, filed on Oct. 9, 2014.

(51) Int. Cl.
*B60W 40/08*    (2012.01)

(52) U.S. Cl.
CPC ..... *B60W 40/08* (2013.01); *B60W 2040/0809* (2013.01)

(58) Field of Classification Search
CPC ............... B60W 40/08; B60W 2040/0809
USPC ........................................... 340/5.8
See application file for complete search history.

(56) References Cited

U.S. PATENT DOCUMENTS

| 5,229,764 A * | 7/1993 | Matchett ............ G07C 9/00158 340/5.52 |
| 5,812,067 A * | 9/1998 | Bergholz ................ B60R 25/04 180/257 |
| 6,631,271 B1 * | 10/2003 | Logan ..................... G06F 3/002 340/539.13 |
| 7,088,220 B2 * | 8/2006 | Kotzin ............... G07C 9/00142 340/5.52 |
| 7,937,075 B2 | 5/2011 | Zellner |
| 2007/0211923 A1 | 9/2007 | Kuhlman |

(Continued)

FOREIGN PATENT DOCUMENTS

| DE | 42114556 A1 | 7/1993 |
| WO | 2013133791 | 9/2013 |

OTHER PUBLICATIONS

GB Search Report 1517796.7 dated Feb. 29, 2016.

(Continued)

*Primary Examiner* — Edwin Holloway, III
(74) *Attorney, Agent, or Firm* — Frank MacKenzie; Bejin Bieneman PLC

(57) ABSTRACT

A vehicle system includes a driver identification fusion module programmed to receive a confidence level from a plurality of identification modules. Each confidence level indicates the likelihood that a driver of a vehicle is a particular person. The driver identification fusion module is programmed to aggregate the confidences levels received from the plurality of identification modules and output an aggregated confidence level signal representing an identity of the driver based at least in part on the confidence levels received from the plurality of identification modules.

19 Claims, 5 Drawing Sheets

(56) References Cited

U.S. PATENT DOCUMENTS

| | | |
|---|---|---|
| 2007/0241861 A1 | 10/2007 | Venkatanna et al. |
| 2008/0085689 A1 | 4/2008 | Zellner |
| 2010/0087987 A1 | 4/2010 | Huang et al. |
| 2013/0041521 A1 | 2/2013 | Basir et al. |
| 2013/0169410 A1 | 7/2013 | Amselem |
| 2014/0200737 A1* | 7/2014 | Lortz ................ B60R 25/25 701/1 |
| 2014/0240089 A1* | 8/2014 | Chang ............. G07C 9/00111 340/5.61 |

OTHER PUBLICATIONS

Veeraraghavan et al., Driver Activity Monitoring through Supervised and Unsupervised Learning, Proceedings of the 8$^{th}$ International IEEE Conference on Intelligent Transportation Systems, Vienna, Austria, Sep. 13-18, 2006 (6 pages).

* cited by examiner

ADAPTIVE DRIVER IDENTIFICATION FUSION

CROSS-REFERENCE TO RELATED APPLICATION

This application claims priority to U.S. Provisional Patent Application No. 62/061,821, titled ADAPTIVE DRIVER IDENTIFICATION FUSION and filed on Oct. 9, 2014, the contents of which are hereby incorporated by reference in their entirety.

BACKGROUND

When multiple drivers use a car, each of the multiple operators may have distinct vehicle setting preferences. Various technologies, such as key fob recognition, wireless device detection, etc., may be used to identify the operator. Biometric systems have also been incorporated into vehicles to enable a car controller to identify (or best guess) a current driver, and automatically adjust vehicle settings to match the given user's preferences. For example, biometric systems may identify a vehicle operator based on fingerprint data, retinal data, facial features, etc.

DETAILED DESCRIPTION

Figure 1:
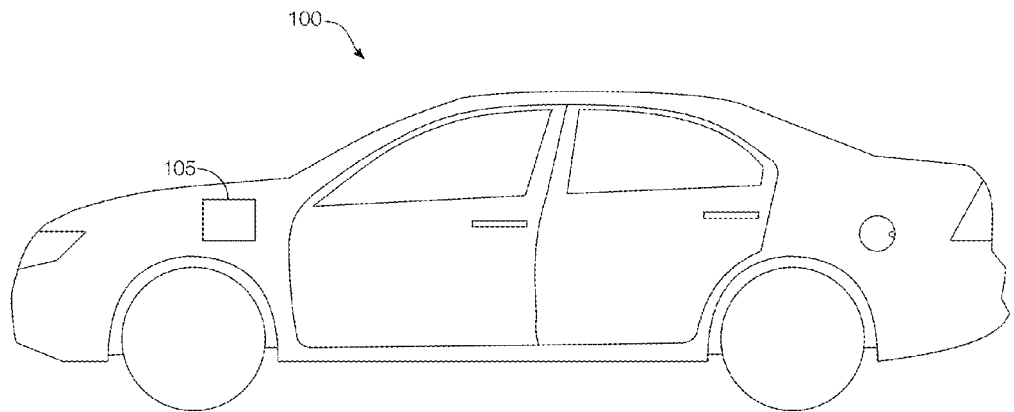
FIG. 1 illustrates an example vehicle having a driver identification system.

Some operator recognition systems have deficiencies. As an example, biometric systems may not be able to accurately identify the operator if the operator has changed his or her physical appearance. For example, if an operator has had a significant haircut or has changed his or her hair color since the biometric system was calibrated for the operator, the controller may not be able to identify the operator which high confidence. In some cases, the controller may misidentify the operator as an alternate user and adjust the vehicle settings based on the alternate user. As such, this may result in the vehicle operator having to readjust vehicle settings, degrading the in-vehicle experience. In still further cases, the vehicle operation may be limited due to the controller not recognizing the primary vehicle operator accurately.

Disclosed herein are methods and systems for identifying a vehicle operator more accurately and reliably than previously possible, even in instances where a vehicle operator's physical appearance has change. Accordingly, a method of driver identification includes adjusting a driver identification confidence based on input received from mechanisms using various technologies. Each technology may be weighted independently of the other technologies based on confidence in the particular technology. Thus, a fusion of identification technologies may be used to identify the driver of the car. Such technologies that may be used together include (but not limited to) facial recognition, wireless device detection, key fob recognition, fingerprint recognition, and voice recognition. An in-vehicle process may fuse the results of each individual technology together and weigh the contribution of each technology to determine the user behind the steering wheel. The method may also allow for static (supervised) and dynamic (unsupervised) updates of the driver learning process. In this way, the user identification can be adaptively adjusted, even as an operator's appearance changes or otherwise causes a drop in confidence rating of one or more driver identification technologies.

Each individual identification system may output driver identification information, including information that can be interpreted as "confidence values" that the driver in the vehicle is a particular person. The system may receive and aggregate the signals from multiple identification systems. The aggregated output may be multiple signals, e.g., one per potential driver, or a single signal representing the confidence levels of all potential drivers. Nevertheless, the aggregated confidence level signal may include or be used to determine a list of all possible drivers known to the system as well as the confidence level for each driver.

The individual systems may be able to use the information in various ways. Some systems, including systems where determining the driver may not be critical or important, may determine which person has the highest confidence level and determine that the person with the highest confidence level is the present driver of the vehicle. For systems where knowing the actual driver is more important, such as systems that display or rely on personal information, the system may not disclose any personal information about any driver until, e.g., the identity of the driver has been confirmed. Thus, if the confidence levels for the most likely potential drivers are similar, the system may not display any personal information until the actual identity of the driver has been confirmed.

Moreover, for instances where the driver identities cannot be resolved because, e.g., similar confidence levels are associated with two or more potential drivers, the system may determine which settings apply to the two or more potential drivers and make appropriate adjustments. For example, if the two most likely drivers have the same or similar seat settings, the seat position may be adjusted to, e.g., an average setting, at least until the driver can be identified more specifically.

The elements shown may take many different forms and include multiple and/or alternate components and facilities. The example components illustrated are not intended to be limiting. Indeed, additional or alternative components and/or implementations may be used.

As illustrated in FIG. 1, the host vehicle 100 includes a driver identification system 105 that can fuse driver identifications performed by multiple devices into a universal driver identity relative to the operation of the vehicle. Although illustrated as a sedan, the vehicle may include any passenger or commercial automobile such as a car, a truck, a sport utility vehicle, a crossover vehicle, a van, a minivan, a taxi, a bus, etc. In some possible approaches, the vehicle is an autonomous vehicle configured to operate in an autonomous (e.g., driverless) mode, a partially autonomous mode, and/or a non-autonomous mode.

Figure 2:
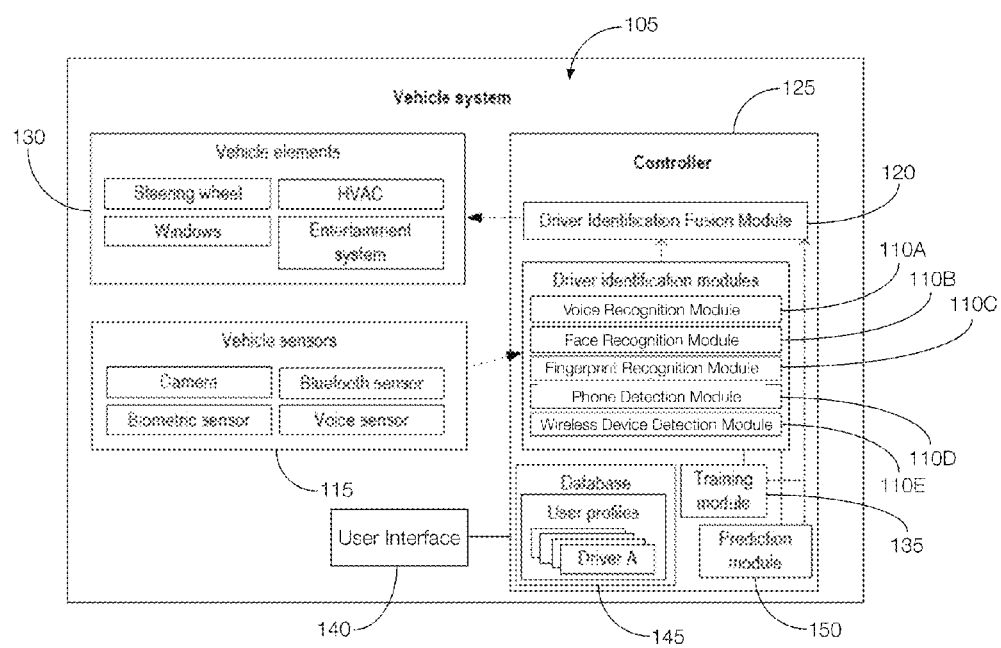
FIG. 2 illustrates an example driver identification system that implements a driver identification fusion module to identify a driver.

Referring to FIG. 2, the driver identification system 105 may include multiple identification modules 110. Each identification module 110 may include a computing device configured or programmed to receive an input from at least one vehicle sensor 115. The driver identification system 105 may include, for example, a voice recognition module 110A, a face recognition module 110B, a fingerprint recognition module 110C, a phone detection module 110D, a wireless device detection module 110E, among others. The voice recognition module 110A may include any computing device configured or programmed to receive an input from a voice sensor. The face recognition module 110B may include any computing device configured or programmed to receive an input from a vehicle camera. The fingerprint recognition module 110C may include any computing device configured or programmed to receive an input from a biometric fingerprint sensor coupled to a steering wheel or a vehicle door handle. The phone detection module 110D, the wireless device detection module 110E, or both, may include any computing device configured or programmed to receive an input from a phone device (e.g., mobile phone) located in the host vehicle 100 or a fob near or in the host vehicle 100. In the instance of a wireless device detection module 110E, the communication between the mobile device and the driver identification system 105 may be in accordance with the Bluetooth® or other wireless communication protocol. The output of each identification module 110 may include, e.g., a prediction of a known user (or a set of users) and possibly additional information. For example, the output may indicate the most likely user (or users) and a confidence value for each user. The confidence value may indicate a confidence that the input from the corresponding sensor was from the given user.

Figure 3:
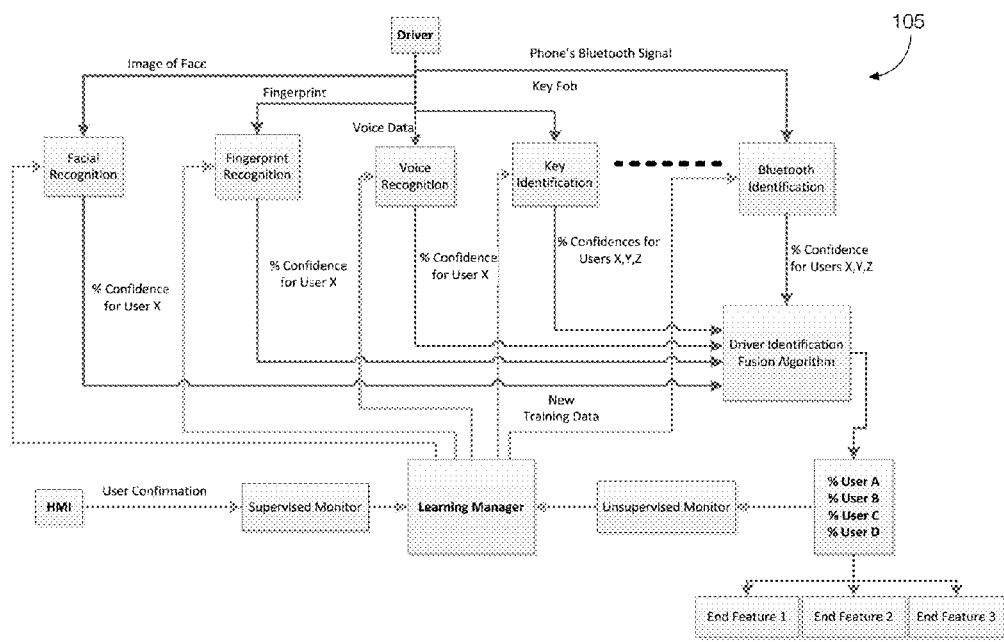
FIG. 3 is a signal flow diagram of the example driver identification system of FIG. 2.

As shown in FIG. 3, each identification module 110 may be configured or programmed to generate an output corresponding to the most likely user (or set of users) based on the sensor inputs received at that particular module. As such, each module may be communicatively coupled to a specific set of sensors 115. The specific set being overlapping or non-overlapping, meaning some sensors 115 may output signals to more than one identification module 110. In other words, some sensors 115 may output signals to only one identification module 110 while other sensors 115 may output signals to multiple identification modules 110.

The output from each identification module 110 (including a list of possible matches and their matching vectors or confidence values) may be provided to a driver identification fusion module 120 (DIFM) incorporated into, e.g., the controller 125 (see FIG. 2). The controller 125 may include a computing device programmed to implement the driver identification fusion module 120. Likewise, the driver identification fusion module 120 may be implemented by a computing device programmed to weigh the inputs received from the various identification modules 110 and produce an output that communicates to other systems in the host vehicle 100 the likelihood of the current driver being associated with one of the stored driver profiles.

Figure 4:
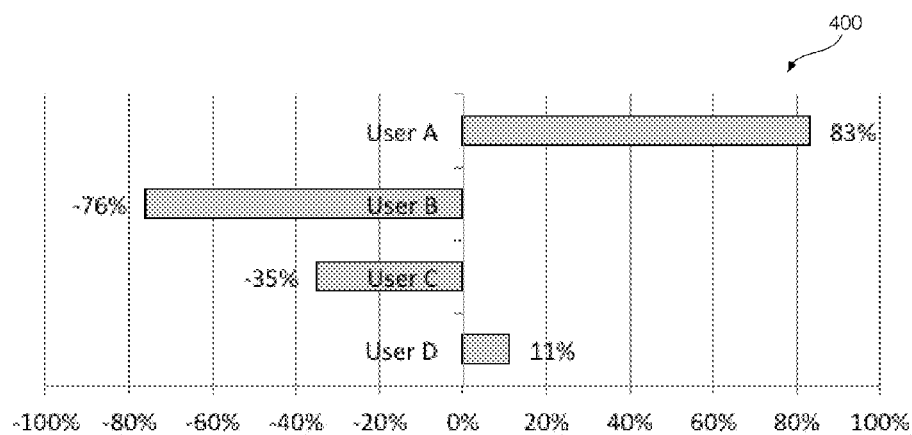
FIG. 4 is a graph showing example confidence determinations of the driver identification fusion module of FIG. 2.

For each driver profile, a confidence value may be expressed ranging from 100% (e.g., the system is completely sure that the driver is a particular person) to negative 100% (e.g., the system is completely sure that the driver is not a particular person). A value of 0% may indicate that the system cannot indicate with any confidence whether or not the driver is a particular person. An example of such confidence outputs is shown in the graph 400 of FIG. 4. As illustrated, the driver identification system 105 has assigned a value of 83% to Driver A, a value of −76% to Driver B, a value of −35% to Driver C, and a value of 11% to Driver D. According to these example values, the driver identification system 105 may determine that Driver A is likely the person operating the host vehicle 100.

Figure 5:
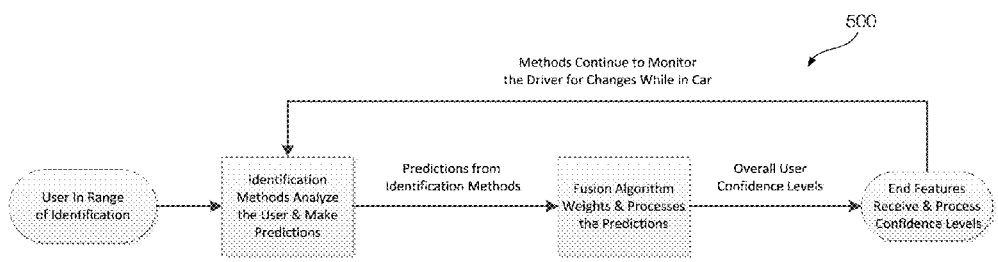
FIG. 5 is a block diagram illustrating a process that may be executed by the driver identification fusion module of FIG. 2.

Each identification module 110 may not actually make an ultimate decision of the driver is a particular person. Rather, it may be up to each end feature to make that decision based on the input from the driver identification fusion module 120 and the individual confidence of that end feature. The phrase "end feature" may refer to a particular vehicle subsystem that may use a driver profile, such as a radio, navigation, seat controller, etc., as elaborated below. As illustrated in the block diagram 500 of FIG. 5, since some individual identification modules 110 can take a longer time to provide an input, or can improve their input over time (e.g., a voice detection system or voice recognition module 110A may not yield a result until the driver actually speaks while a fingerprint recognition module 110C may yield a result as soon as the driver touches the steering wheel), the driver identification fusion module 120 may continuously monitor the inputs and provide a continuously updated output that is expected to increase the confidence in one of the driver profiles over time, and decrease the confidence in others.

The controller 125 may further include an end feature 130 (see FIG. 2). The end feature 130 may include a vehicle feature that needs to know the identity of the current driver in order to perform certain tasks. Example end features 130 may include a navigation system, an entertainment system, etc. In one possible implementation, the controller 125 may receive the confidence value for each user from the driver identification fusion module 120 and communicate the confidence values to each end feature 130, such as to the navigation system, the radio system, etc. Each end feature 130 may then be programmed to independently determine driver settings based on the received information.

As such, different end features 130 may need different confidence levels in the driver identification to perform their respective tasks for reasons such as, e.g., protecting a driver's privacy. Protecting privacy may be significant in the context of shared vehicles like, e.g., rental car services or other services where strangers may share a particular vehicle. For instance, the host vehicle 100 may not wish to disclose a driver's home address until the host vehicle 100 is certain that the person operating the host vehicle 100 is that particular driver.

Figure 6:
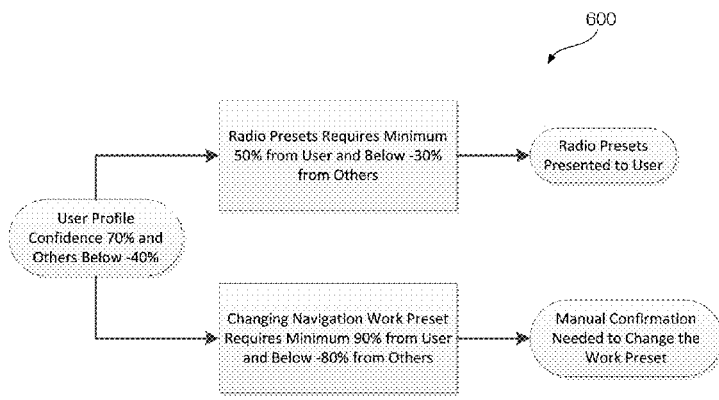
FIG. 6 is a block diagram illustrating how different vehicle systems use different characteristics to identify a driver.

An example of a circumstance where different driver confidence levels are ascertained is presented in the block diagram 600 of FIG. 6. As shown, a navigation system could enable the set of radio presets for one driver (referred to as Driver A) if the driver identification fusion module 120 indicates that it is at least 50% sure that the current driver is Driver A and at least −30% sure the driver is not one of the other stored drivers. Even if the controller 125 is not completely sure about the identity of the driver, it may not be highly problematic if the entertainment system displays the wrong radio preset stations (i.e., the radio preset stations associated with a different person). The entertainment system may be relatively confident that it will not end up displaying the personal radio presets for one of the other associated drivers since they were at a confidence of less than −30%, and there is an 80% difference to the only possible actual driver. An incorrect identification of the driver may be more problematic for other systems, however. For example, when the navigation system is asked to change the location of the destination preset for "work," it may necessitate a higher degree of confidence, e.g., more than 90%, that the current driver is correctly identified and that none of the other drivers are more than ~80% likely to be the actual current driver. In this case, if a driver was only detected to 70% confidence, the right radio presets may be displayed, but the system may prompt the driver to manually confirm his or her identity in order to change the destination preset. Alternatively, the system may prompt the driver to manually confirm the destination preset for "work."

The request for manual confirmation can take various forms, such as asking the driver to select from a shortlist of options of possible people, asking the driver to speak a word previously used during user profile set-up and calibration, asking for fingerprint input, etc. The confidence values may be adjusted after receiving the manual confirmation input. One way to adjust the confidence levels may include increasing the confidence level associated with the identity of the driver to a level above the threshold. Doing so may enable the end feature 130 to adjust settings based on that driver and, e.g., prevent the user from changing the preset for an end feature 130, e.g., a "work" destination in a navigation system, when the confidence level in the driver identity is not sufficiently high. In this way, the confidence threshold for each identification module 110 may be varied based on the criticality of the identification module 110, e.g., more critical identification modules 110 may have higher thresholds. Thus, actions may be automatically taken by an identification module 110 if the threshold is crossed. If the threshold is not crossed, however, the identification module 110 may require additional input from the operator to perform the action or to raise the confidence value over the threshold. Separating the end decision to the driver also has the added advantage that some end features 130 might be able to draw some conclusions based on predictions instead, as elaborated below.

If the end features 130 determine confidence values below their respective threshold levels and do not hold critical personal user data, the end feature 130 may identify the most likely driver or drivers based on the confidence values (e.g., top 3 candidates), and adjust vehicle settings based on their profiles. For example, the radio system discussed above with reference to FIG. 6 may select a station that is common between the profiles of the most likely drivers.

Figure 7:
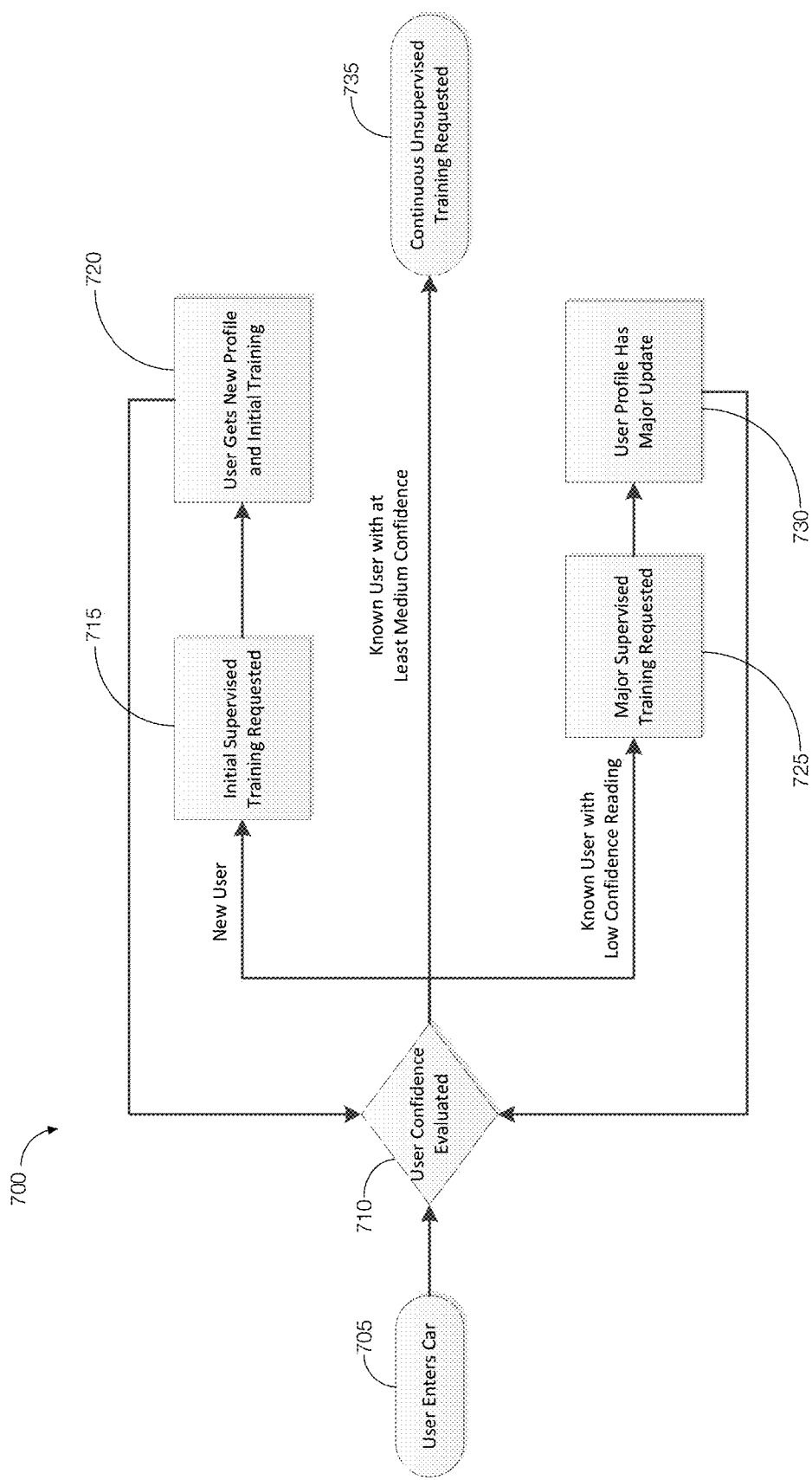
FIG. 7 is a process flow diagram that may be executed by the driver identification fusion module to learn characteristics about a new and known user.

With reference to FIGS. 2 and 7, the controller 125 may further include a training module 135 programmed to allow for initial driver identification calibration. The training module 135 may include any computing device programmed to calibrate each of the individual identification modules 110. When the system is initially used, the driver may be prompted by the vehicle user interface 140 (see FIG. 3), such as a human machine interface (HMI), to provide an initial "driver identification" that may be stored in a driver profile. The driver profile may be stored in a memory device accessible to the controller 125. For instance, the driver profile may be stored in a driver database 145. By building the driver profiles, driver attributes may be learned, and each module may be calibrated based on the learned driver attributes. If the driver approves the initial driver identification, an initial supervised training request may be issued by the training module 135 to the individual recognition systems or identification modules 110. That request may contain a selected driver profile ID and instructions to perform initial training. For example, a base or reference picture of the driver may be stored for use in subsequent detections. When this training is over, each identification systems may start producing a driver identification vector continuously. The driver identification vector may include the confidence levels discussed above.

At subsequent uses of the host vehicle 100, the training module 135 may monitor the output of each identification module 110. If the vector (i.e., confidence level) indicates at least medium-high likelihood that the driver is a known person, a continuous unsupervised training request may be issued to the individual identification module 110, allowing each module to modify the existing data related to the current driver profile ID. This way, the vehicle system can dynamically evolve with changes to a known driver's appearance. For example, a driver profile on a face recognition module 110B may dynamically evolve as a male driver grows a beard or a male or female driver changes her hairstyle or hair color. The training request may not be issued if the probability of a specific, known driver is too low (e.g., lower than a threshold).

Further, if a subsystem 130 does not receive a high-enough confidence in a single specific driver, yet such information is necessary to continue (e.g. to store a new "home location" the navigation system must be very sure that it knows who the current driver is), the vehicle system can prompt the driver to verify his or her identity. The prompt, the response, or both, may be made via, e.g., a user input that the vehicle system can use to adjust the confidence value. After the driver performs this manual verification, a major supervised training request may be transmitted from the training system, allowing the individual systems to do a major re-training to quickly adapt to the updated driver profile.

FIG. 7 illustrates an example process 700 that may be executed by the training module 135. The process 700 may include a block 705 of detecting when a user enters the host vehicle 100. At decision block 710, the training module 135 may evaluate the user confidence level. If the confidence level is associated with an unknown user, the process 700 may continue at block 715. If the user is known, but there is a low confidence level, the process 700 may continue to block 725. If the user is known with a medium or high confidence level, the process 700 may continue to block 735. At block 715, the training module 135 may begin an initial supervised training. At block 720, the training module 135 may create a new entry in the driver database 145 for the new user. The process 700 may proceed back to decision block 710. At block 725, the training module 135 may conduct a supervised training. At block 730, the user's profile in the driver database 145 may be updated with the new user information gathered at block 725. The process 700 may return to block 710. At block 735, the training module 135 may perform continuous unsupervised training, as discussed above. The process 700 may continue to execute until, e.g., the host vehicle 100 is turned off.

In certain implementations, a prediction module 150 (see FIG. 2) of the controller 125 can receive and use the different confidences of the driver identification from the driver identification fusion module 120 in order to provide value for a less critical function even under "bad circumstances". As an example, the controller 125 may predict that its confidence value in detecting four different drivers are {A: 42%, B: 41%, C: −28%, D: −98%}. In this case, it is impossible for the controller 125 to determine whether the actual driver is Driver A or Driver B, although, in this example, it is quite clear that the actual driver is neither Driver C nor Driver D. The radio module, therefore, may not set the all radio station presets, but it may tune the radio to a particular main station if it determines that both Driver A and Driver B have the same default "main station". The controller 125 can therefore tune the radio to the main station providing personalization to either Driver A or Driver B, even though it could not properly set all the presets. In other words, the controller 125 may select the radio preset that is common to both Driver A and Driver B. Likewise, a similar basic adjustment of the seat by the seat module can be performed to provide a seat setting that is common to both Driver A and Driver B if Driver A and Driver B have a similar physical body size that is different from the body sizes of Driver C and Driver D. In one possible approach, the controller 125 may use the setting that is common to both the shortlisted drivers, while in an alternate example, the controller 125 may use the setting that is the average (e.g., average body size) of the shortlisted drivers.

Figure 8:
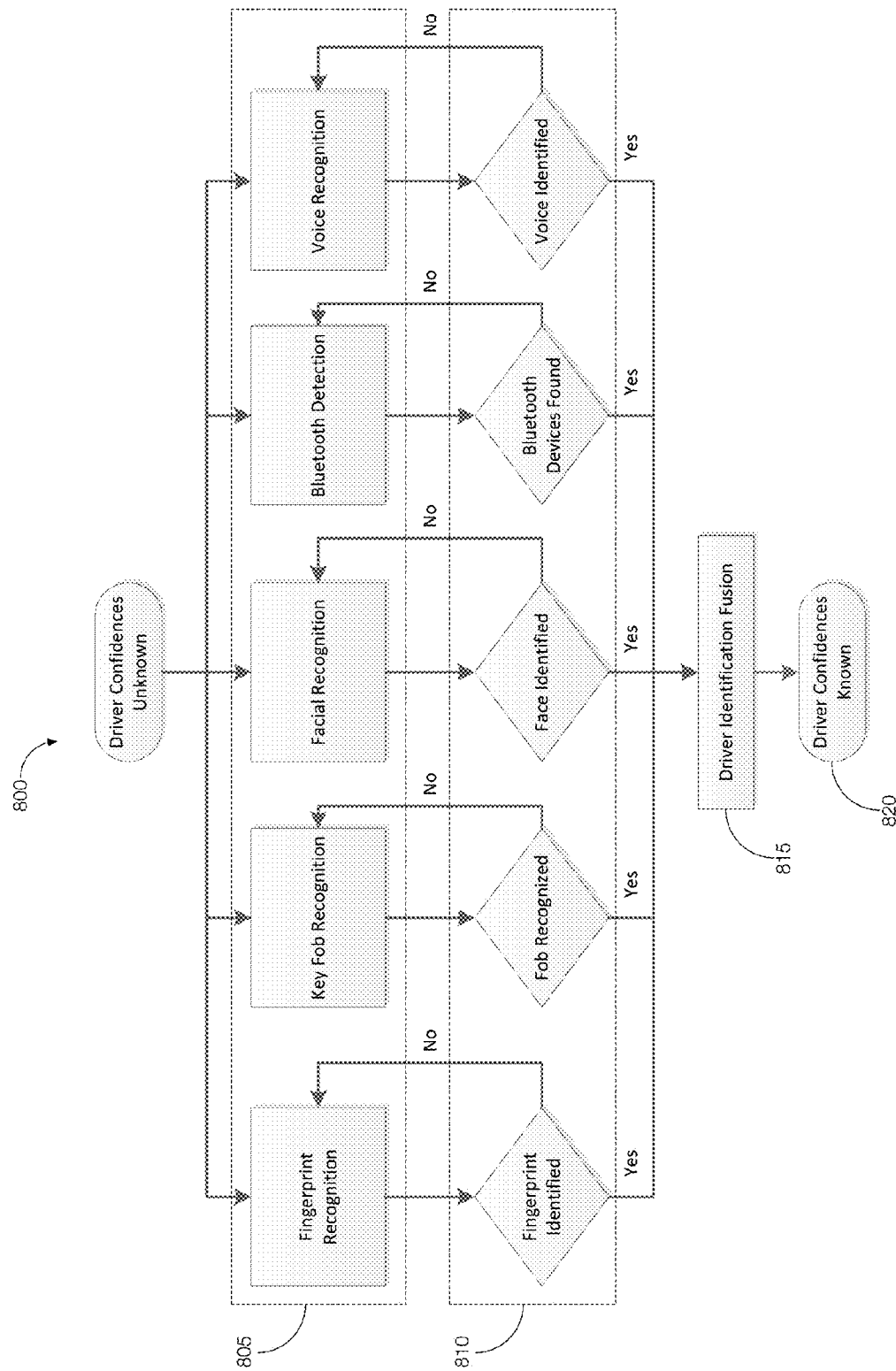
FIG. 8 is a process flow diagram of an example process that may be executed by the driver identification fusion module to identify the driver.

FIG. 8 depicts an example fusion process 800 that may be executed by the driver identification fusion system described above. As illustrated, the driver identification fusion module 120 may receive signals from the various identification modules 110 located in the host vehicle 100. At block 805, each identification module 110 may collect information about the driver. At block 810, using the information collected at block 805, each module may determine whether a certain characteristic of the driver has been identified. If so, the identification module 110 may output a signal, include a signal representing an identification of the driver, to the driver identification fusion module 120. The driver identification may be presented via, e.g., the confidence levels that the driver is a particular person. If the driver cannot be identified by a particular module, the process 800 for at least that module may return to block 805 so that the identification module 110 may continue to collect information about the driver until the driver can be identified. At block 815, the driver identification fusion module 120 may collect and aggregate the identifications made by the identification modules 110 at block 810. In some instances, the driver identification fusion module 120 may collect the confidence levels associated with each possible driver, apply a weight to the confidence levels, and determine who the driver might be based on the aggregated confidence levels. At block 820, the driver identification fusion module 120 may output an aggregated confidence level signal indicating the most likely identify of the driver based on the information collected at block 805. The individual end features 130 may receive the aggregated confidence level signal and determine the identity of the driver accordingly.

By way of example, suppose Driver A enters a host vehicle 100 equipped with the driver identification fusion system using key fob recognition, facial recognition, wireless device detection, and voice recognition. Driver A may share the host vehicle 100 with three other people: Driver B, Driver C, and Driver D. The key fob used by Driver A is only used by Driver A and Driver B. The system may boost confidence levels that those two drivers are the current driver, while lowering the confidence in the other two driver profiles, upon receipt of a signal identifying the key fob as the key fob used by Driver A or Driver B. As Driver A enters the car, his phone may be recognized, so, once again, his profile confidence is increased while the others are decreased. The push-button start may also serve as a fingerprint reader. When Driver A starts the host vehicle 100, the start button may be scanned for Driver A's fingerprint. Once identified as belonging to Driver A, the profile confidence associated with Driver A may be raised while the profiles confidences associated with the other possible drivers may be lowered. Since fingerprint reading may be a stronger method of identification, this adds a larger amount of confidence in Driver A, and the confidence levels for B, C, and D drop more, relative to some of the other identification techniques performed. A camera, which may be located in the host vehicle 100 behind the steering column, may capture an image of Driver A. A facial recognition technique may be executed on the captured image to find a match. The facial recognition system may recognize the driver as Driver A, so the confidence level associated with Driver A may be raised again while the others are lowered. At this point, the system may have a high degree of confidence in Driver A, and that the other drivers are not using the car. Driver A may speak to issue commands to a voice-activated infotainment system. The voice recognition system may analyze Driver A's voice data by, e.g., matching voice characteristics to Driver A's profile. At this point, the confidence level associated with Driver A may have now achieved the maximum possible 100% while the others are much closer to −100%. At some point during the drive, Driver A's phone may disconnect from the host vehicle 100 from, e.g., a loss in battery power, such that the phone is no longer visible to the car. The confidence level in Driver A may be lowered as a result. The confidence level, nevertheless, may remain relatively high due to the other systems that are present. Table 1 shows how the driver identification fusion module 120 may handle information as multiple identification modules 110 begin capturing information or identifying the user.

| Event | Prediction | Driver A | Driver B | Driver C | Driver D |
| --- | --- | --- | --- | --- | --- |
| Key Fob | A | +10% | +10% | −10% | −10% |
| Phone Bluetooth | A | +20% | −10% | −10% | −10% |
| Fingerprint Recognition | A | +40% | −20% | −20% | −20% |
| Facial Recognition | A | +23% (+30% possible) | −15% | −15% | −15% |
| Voice Recognition | A | +24% (+30% possible) | −15% | −15% | −15% |
| Phone Loses Battery | None | −30% | 0% | 0% | 0% |
| Total Confidence: | | 97% | −50% | −70% | −70% |

The weightage or contribution of each individual module to the driver identification fusion module 120 may be adjusted based on its individual criticality to reduce incorrect driver identification. Using the adaptive training module 135, the system can adapt to the user, even when his appearance changes. In this way, fusing the output of multiple identification technologies creates a more accurate driver identification system 105. Moreover, certain identification modules 110 may be programmed or configured to collect driver information with higher certainty than other identification modules 110. For example, the fingerprint recognition module 110C or phone detection module 110D may be programmed to identify a particular driver more accurately than, e.g., recognizing the driver from the key fob since a driver is more likely to lend out his or her key fob than his or her phone. Certainly, a driver's fingerprints will not change. The values in Table 1, therefore, may be weighted to give more credibility to the fingerprint recognition module 110C and phone recognition module than one or more other identification modules 110.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
 a controller including a driver identification fusion module programmed to receive an individual confidence level from each of a plurality of identification modules, each individual confidence level indicating a likelihood that a driver of a vehicle is a particular person, wherein the driver identification fusion module is programmed to aggregate the individual confidence levels received from the plurality of identification modules and output an aggregated confidence level signal representing an identity of the driver based at least in part on the individual confidence levels received from the plurality of identification modules, and wherein the controller further includes a prediction module programmed to determine a common setting with regard to at least two known drivers, and when the aggregate confidence level is below a predetermined threshold, the prediction module is programmed to output a signal to the driver identification fusion module identifying the common setting and wherein the controller controls at least one vehicle subsystem according to the common setting.

2. The vehicle system of claim 1, wherein the driver identification fusion module is programmed to identify the driver based at least in part on a driver profile stored in a driver database.

3. The vehicle system of claim 1, wherein the plurality of identification modules includes at least one of a voice recognition module, a face recognition module, a fingerprint recognition module, a phone detection module, and a wireless device detection module.

4. The vehicle system of claim 1, further comprising a training module programmed to generate a driver profile, wherein the training module is programmed to perform supervised training when the aggregate confidence level is below the predetermined threshold and unsupervised training when the aggregate confidence level is above the predetermined threshold.

5. The vehicle system of claim 4, wherein the training module is programmed to store the driver profile in a driver database.

6. The vehicle system of claim 4, wherein the training module is programmed to continuously update the driver profile based at least in part on signals generated by at least one of the plurality of identification modules.

7. The vehicle system of claim 1, wherein the driver identification module is programmed to output a control signal to control at least one vehicle subsystem based on the signal output by the prediction module.

8. The vehicle system of claim 1, wherein the driver identification fusion module is programmed to output a control signal to at least one vehicle subsystem.

9. The vehicle system of claim 8, wherein the control signal includes a setting associated with the identity of the driver determined by the driver identification fusion module when the aggregate confidence level is above the predetermined threshold.

10. A method comprising:
collecting, via a plurality of identification modules, driver information associated with a driver of a vehicle;
determining a likely identity of the driver based at least in part on the driver information;
generating, via each of the plurality of identification modules, an individual confidence level associated with the driver, wherein the individual confidence level represents a likelihood that the driver of the vehicle is a particular person;
aggregating the individual confidence levels received from the plurality of identification modules at a driver identification fusion module;
generating an aggregated confidence level signal representing an identity of the driver based at least in part on the plurality of individual confidence levels;
detecting that the aggregate confidence level is below a predetermined threshold; and
when the aggregate confidence level is below the predetermined threshold, determining a common setting with regard to at least two known drivers and controlling at least one vehicle subsystem according to the common setting.

11. The method of claim 10, further comprising:
when the aggregate confidence level is above the predetermined threshold, generating a control signal to control the at least one vehicle subsystem, wherein the control signal represents a setting associated with the driver identified different from the common setting and applying the setting associated with the driver identified instead of the common setting.

12. The method of claim 10, wherein determining the identity of the driver includes accessing a driver profile stored in a driver database.

13. The method of claim 10, further comprising:
detecting an unknown driver;
generating a driver profile associated with the unknown driver; and
storing the driver profile in a driver database.

14. The method of claim 12, further comprising continuously updating the driver profile based at least in part on signals generated by at least one of the plurality of identification modules by performing supervised training when the aggregate confidence level is below the predetermined threshold and unsupervised training when the aggregate confidence level is above the predetermined threshold.

15. The method of claim 10, further comprising:
generating, via the driver identification fusion module, a control signal to control at least one vehicle subsystem based on the signal identifying the common setting.

16. The method of claim 10, further comprising:
generating, via the driver identification fusion module, a control signal; and
transmitting the control signal to at least one vehicle subsystem.

17. The method of claim 16, wherein the control signal is generated to represent a setting, different from the common setting, associated with the identity of the driver determined by the driver identification fusion module when the aggregate confidence level exceeds the predetermined threshold.

18. A vehicle system comprising:
a controller having a plurality of identification modules including:
a driver identification fusion module programmed to receive an individual confidence level from each of at least one of the plurality of identification modules, each individual confidence level indicating a likelihood that a driver of a vehicle is a particular person, wherein the driver identification fusion module is programmed to aggregate the confidence levels received from the plurality of identification modules and output an aggregated confidence level signal representing an identity of the driver based at least in part on the individual confidence levels received from at least one of the plurality of identification modules;
a prediction module programmed to determine a common setting with regard to at least two known drivers, and when the aggregate confidence level is below a predetermined threshold, the prediction module is programmed to output a signal to the driver identification fusion module identifying the common setting and wherein the controller controls at least one vehicle subsystem according to the common setting; and
- a training module programmed to generate a driver profile and store the driver profile in a driver database.

19. The vehicle system of claim 18, wherein the training module is programmed to continuously update the driver profile based at least in part on signals generated by at least one of the plurality of identification modules, wherein the training module is programmed to perform supervised training when the aggregate confidence level is below the predetermined threshold and unsupervised training when the aggregate confidence level is above the predetermined threshold.

* * * * *